United States Patent
Lok

(10) Patent No.: US 11,363,676 B1
(45) Date of Patent: Jun. 14, 2022

(54) SYSTEMS AND METHOD FOR AUTONOMOUSLY PERFORMING A WI-FI SITE SURVEY USING LPWAN AND IOT TECHNOLOGY

(71) Applicant: Aidan Lok, Howard Beach, NY (US)

(72) Inventor: Aidan Lok, Howard Beach, NY (US)

(*) Notice: Subject to any disclaimer, the term of this patent is extended or adjusted under 35 U.S.C. 154(b) by 0 days.

(21) Appl. No.: 17/387,425

(22) Filed: Jul. 28, 2021

Related U.S. Application Data

(60) Provisional application No. 63/151,753, filed on Feb. 21, 2021.

(51) Int. Cl.
| | |
|---|---|
| *H04L 12/28* | (2006.01) |
| *H04W 88/08* | (2009.01) |
| *H04W 72/04* | (2009.01) |
| *H04L 5/00* | (2006.01) |
| *H04W 76/15* | (2018.01) |
| *H04J 1/16* | (2006.01) |

(52) U.S. Cl.
CPC .......... *H04W 88/08* (2013.01); *H04L 5/0098* (2013.01); *H04W 72/0453* (2013.01); *H04W 76/15* (2018.02)

(58) Field of Classification Search
CPC ..... H04L 41/22; H04L 41/5009; H04L 43/50; H04L 43/145; H04B 17/29; G06F 2211/005; H04H 20/12; H04W 88/08
USPC ................. 370/252, 241, 386, 430
See application file for complete search history.

(56) References Cited

U.S. PATENT DOCUMENTS

| | | | |
|---|---|---|---|
| 10,251,120 B2 | 4/2019 | Ketonen et al. | |
| 10,360,335 B2 | 7/2019 | Kasch et al. | |
| 10,375,591 B2 | 8/2019 | Ketonen et al. | |
| 10,645,593 B2 | 5/2020 | Barmettler et al. | |
| 10,701,517 B1* | 6/2020 | Reed | H04W 4/02 |
| 2007/0107034 A1* | 5/2007 | Gotwals | H04H 20/12 725/129 |
| 2009/0013210 A1* | 1/2009 | McIntosh | H04L 41/0672 714/4.1 |
| 2010/0246416 A1* | 9/2010 | Sinha | H04W 24/06 370/250 |
| 2013/0201316 A1* | 8/2013 | Binder | H04L 67/12 701/2 |
| 2017/0054954 A1 | 2/2017 | Keitler et al. | |
| 2017/0126537 A1 | 5/2017 | Kumar et al. | |
| 2018/0254957 A1 | 9/2018 | Markham et al. | |

(Continued)

*Primary Examiner* — John Pezzlo
(74) *Attorney, Agent, or Firm* — Miller IP Law LLC

(57) ABSTRACT

Embodiments of a system include a graphical user interface (GUI), a wireless access network, a sensor node, and a server node. The GUI is disposed on a user device. The GUI is configured to display a control to conduct a wireless network throughput test. The wireless access network operates on a first communication band. The first communication band provides access to a device connecting to the wireless access network. The wireless access network includes an access point coupled to a central switch to provide wireless communication for network access by devices in range of the access point. The sensor node corresponds to the access point. The sensor node communicates with the access point of the wireless network over the first communication band. The server node communicates with the sensor node over a second communication band distinct from the first communication band and communicates with the central switch.

20 Claims, 12 Drawing Sheets

(56) References Cited

U.S. PATENT DOCUMENTS

| | | |
|---|---|---|
| 2018/0262533 A1 | 9/2018 | McCaig et al. |
| 2018/0316513 A1 | 11/2018 | Gamroth et al. |
| 2018/0338187 A1 | 11/2018 | Ketonen et al. |
| 2019/0052539 A1 | 2/2019 | Pappu et al. |
| 2021/0014710 A1* | 1/2021 | Raju ................ H04W 4/38 |

* cited by examiner

SYSTEMS AND METHOD FOR AUTONOMOUSLY PERFORMING A WI-FI SITE SURVEY USING LPWAN AND IOT TECHNOLOGY

CROSS-REFERENCE TO RELATED APPLICATIONS

The present application is a continuation of U.S. Non-Provisional Patent Application No. 63/151,753 entitled "Systems and Method for Autonomously Performing a WiFi Site Survey Using LPWAN and IoT Technology", filed on 21 Feb. 2021. The entire contents of the above-listed application are hereby incorporated by reference for all purposes.

BACKGROUND

Public access Wi-Fi networks are common communication mechanisms at large public venues (LPVs). This may help to overcome suboptimal penetration of structures by indoor cellular service and the high cost of distributed antenna systems (DAS). Network reliability is paramount because the Internet is commonly considered a critical utility. For example, first responders may be required to utilize the Wi-Fi network to communicate in emergencies.

Most LPV Wi-Fi networks are not resilient or reliable enough for mission-critical applications and often deliver poor end-user experience. In selecting and providing LPV Wi-Fi networks, minimal cost is often a major factor, yet often these networks carry multiple high criticality services such as public safety and surveillance in addition to guest Internet access.

Wireless infrastructure equipment with a robust quality of service (QoS) implementation that would be appropriate for mission-critical networking is dramatically more expensive than typical Wi-Fi equipment that lacks support for QoS. Thus, most LPV Wi-Fi networks are deployed using best-effort equipment with weak or little QoS support in conjunction with performance validation by site-survey.

Post-installation wireless site surveys are common for determining proper network operation. Industry-standard site survey mechanisms generally rely upon a network engineer to record the received signal strength indicator (RSSI) at every location by walking the service area while carrying heavy measuring equipment. The result of the long and arduous site survey process is a heatmap that describes the wireless signal strength at multiple locations within the service area. The presumption is that good signal strength on the heatmap is a reliable indicator of signal integrity and high-speed connectivity.

BRIEF DESCRIPTION OF THE DRAWINGS

The present description will be understood more fully when viewed in conjunction with the accompanying drawings of various examples of autonomously performing a Wi-Fi site survey using LPWAN and IoT technology. The description is not meant to limit the autonomous survey technology to the specific examples. Rather, the specific examples depicted and described are provided for explanation and understanding of autonomous survey technology. Throughout the description the drawings may be referred to as drawings, figures, and/or FIGs.

DETAILED DESCRIPTION

Figure 1:
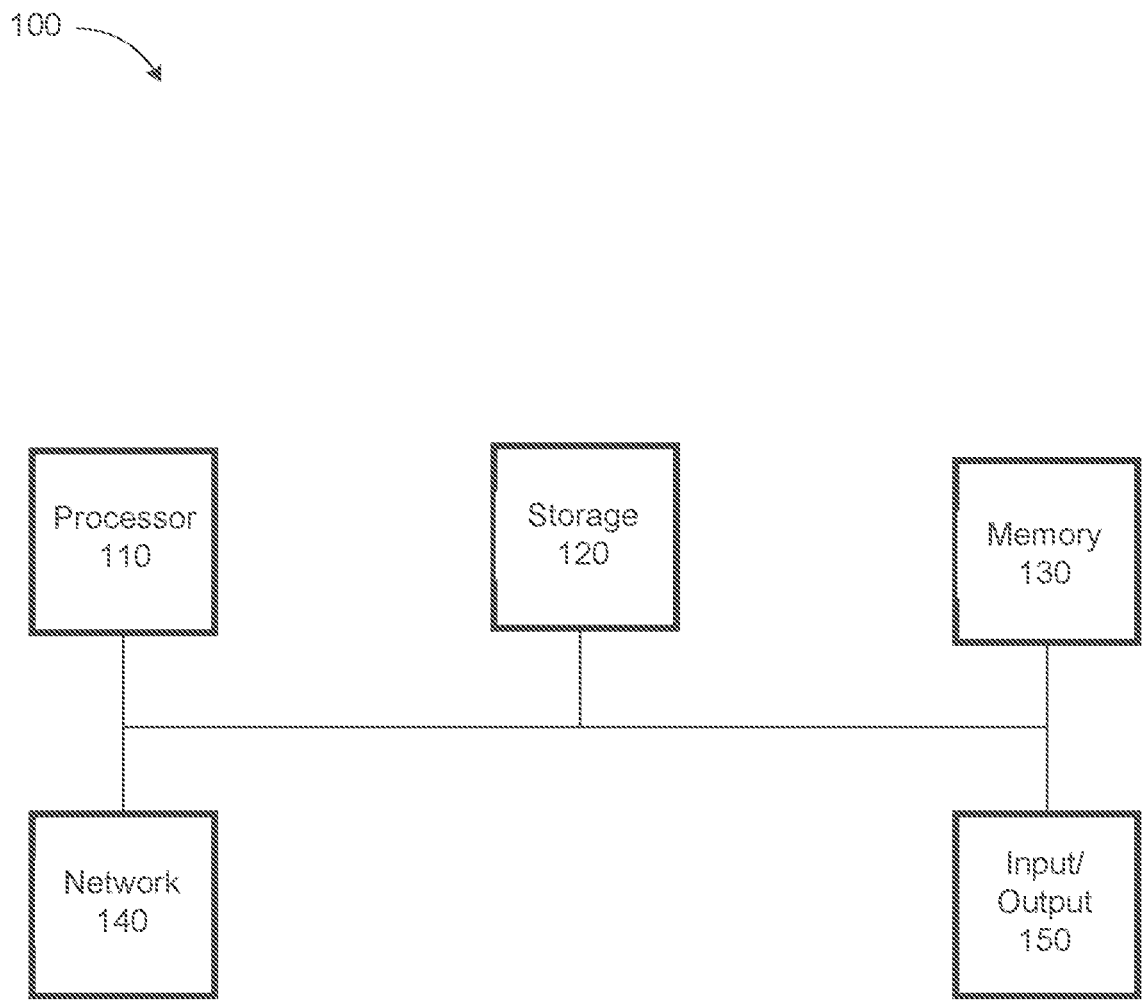
FIG. 1 illustrates a block diagram of a system for autonomous network surveying, according to an embodiment.

An autonomous survey technology as disclosed herein will become better understood through a review of the following detailed description in conjunction with the figures. The detailed description and figures provide merely examples of the various embodiments of autonomous survey technology. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional survey technology may include heavy equipment carried or otherwise transported by a network engineer who must walk the entire property with the heavy equipment to periodically measure the network. This is a process that is costly in many ways. The quality of survey data depends upon many variables including human error. Continuously performing wireless site surveys is prohibitively resource and man-power intensive.

The heatmap generated by conventional survey processes provide an incomplete indicator of end-user experience. True end-user experience would be better measured through active sensing and are rarely included during site surveys due to time and cost. Thus, the industry would benefit from an improvement in the technology used to validate end-user experience for Wi-Fi networks that are deployed with best-effort equipment.

Implementations include autonomous Wi-Fi site survey using LPWAN and IoT technology leveraging Wi-Fi and Long Range (LoRa) enabled Internet of Things (IoT) microcontrollers to autonomously perform wireless site surveys. A mesh network built on LoRa establishes an out-of-band communication network for a fleet of microcontrollers that are distributed across the target premises. The Wi-Fi radio enables the invention to perform an industry-standard speed test in response to control messages transported by the LoRa mesh. Speed test results may be transported over the mesh for collation and reporting. The result is a solution that autonomously performs active measurement to determine true Wi-Fi connection quality at any place on premises at any time for a fraction of the cost of industry-standard tools.

Embodiments may utilize an out-of-band control plane. Use of an out-of-band control plane may avoid performing a test and getting results over a potentially poor Wi-Fi connection to discover the existence of a bad Wi-Fi link. LoRa is an IoT low-power wide-area network (LPWAN) physical layer communication mechanism that is well suited for the out-of-band control plane due to its relatively long-range, low power, and low-cost characteristics. The range of LoRa allows for the creation of a property-wide wireless mesh network with a minimal number of nodes. The low power requirements and low cost of system on chip (SoC) microcontrollers with onboard Wi-Fi and LoRa PHYs make it possible to deploy the system to cover large-scale properties for an affordable price. LoRa and other LPWAN PHYs are generally considered unsuitable for use in performance measurement mechanisms due to inherently low data rates. However, LoRa may be utilized for the out-of-band control plane to signal the measurement data plane implemented using the Wi-Fi radio. The control plane messaging may be designed to fit within the low data rate of LoRa and allow the use of LoRa-enabled SoCs.

Embodiments may include a plurality of sensor nodes and/or a single server node that may be implemented using SoC multi-bearer microcontrollers. A graphical user interface (GUI) controller program may be implemented. Sensor nodes are distributed across the property and provide a mechanism for measuring Wi-Fi connection quality using a Wi-Fi radio. Sensor nodes may be slaved to the server node over the LoRa control plane. The server node may be deployed centrally and allows the controller program to instruct the sensor nodes to perform measurements and report results.

In some embodiments, a controller program for the network administrator may be a proprietary mobile app that is used for management and reporting purposes. Embodiments of the controller program may communicate over wired and/or wireless local area network (LAN) to the server node that is the root of the sequence number-controlled flooding (SNCF) LoRa mesh control plane. In some embodiments, deployment of sensor nodes positions the sensor nodes near wireless access points (WAPs) that the network administrator would like to evaluate or places sensor nodes at likely positions of end-user devices (e.g., in every room of the premises targeted for evaluation) to simulate real-life scenarios. The server node can be placed next to the server rack where the server node can utilize wired networking. In some embodiments, an evaluation mechanism is the industry-standard iPerf speed-test. In some embodiments, an implementation uses Pycom quad-bearer radio integrated LoPy4 microcontrollers. Power sources for some or all of the nodes may include, but are not limited to, a small battery with optional solar or wired chargers and Power over Ethernet (PoE) connections. In some embodiments, the sensor nodes may utilize batteries whereas the server node may utilize PoE.

Some embodiments may determine whether the end-user experience is good or bad. Industry-standard site survey tools measure RSSI throughout the Wi-Fi coverage area in an attempt to validate proper network operation. This measures whether or not a device can hear a signal but does not take into account whether the device can understand the packets within. Some embodiments described herein simulate an end-user device and use an evaluation mechanism that tests the network's throughput. Some embodiments perform a bi-directional iPerf test over Transmission Control Protocol (TCP) on the desired Wi-Fi network. Embodiments may measure and record the total time and payload size of the iPerf test to calculate network throughput. Measuring network throughput is an active approach to performance measurement that more accurately reflects the end-user experience, as opposed to the industry-standard passive measurement of Wi-Fi beacon signal strength.

In some embodiments, the server node performs two tasks, communication with a controller program, and relaying requests from the controller program to the sensor node fleet. In some embodiments, the server node consists of two software modules. The first module may be a custom Hypertext Transfer Protocol (HTTP) web server that responds to POST and GET requests. Initiation of probes and speed tests may be supported POST requests. The web server may be configured to translate POST requests into messages transmitted to the sensor nodes over the LoRa control plane.

In some embodiments, a probe may be initiated when the user presses a button or otherwise provides an input on/at the GUI. The controller program may send an initiation request to the server node which may forward the request to the sensor node over the LoRa control plane. The sensor node receives the probe request message and checks it against the stored list of messages. The sensor node compiles a list of all nearby Wi-Fi service set identifiers (SSIDs) because the message is determined to be new. The sensor node may then send each SSID individually over the LoRa control plane back to the server node. The controller program then sends a request to the server node for the probe data. The server node responds with the list of SSIDs.

In some embodiments, the network administrator may initiate a speed test on the GUI. The device communicates with the server node via Wi-Fi, which in turn uses SNCF to distribute the speed test request across the sensor fleet over the LoRa control plane until it reaches the desired sensor node. In this exemplary implementation, the sensor node executes an iPerf speed test over the Wi-Fi data plane on the specified network to measure wireless throughput. It is reasonable to presume that the network is constructed such that the wired capacity exceeds the usable wireless capacity and thus will not be the bottleneck. In some embodiments, tests can be performed during normal operating hours to evaluate the network realistically, or they can be performed during off-hours to evaluate the system in isolation.

In some embodiments, the second software module is a LoRa transceiver function which may be common to both server and sensor nodes. The transceiver module implements a Sequence Number Controlled Flooding (SNCF) algorithm to ensure that every node receives messages even if distant neighbors transmit them. The software module also implements a first in first out (FIFO) queue of all LoRa messages. The list of messages in the FIFO queue may be used to exclude previously seen messages. New messages may be added to the queue, re-transmitted, and then processed according to the destination and payload imperative.

In some embodiments, messages may contain a destination. Possible destinations may include the server node, the media access control (MAC) address of a sensor node, or broadcast in the exemplary implementation, but can be modified to match any identifier desired on the nodes. A message destined for the server node returns results from a probe or a speed test. A message destined for a sensor node is an initiation request for a speed test. A broadcast message is used to initiate a probe. The probe initiation request tells all sensor nodes to scan for any nearby Wi-Fi SSIDs and report their findings to the server node. Sensor nodes send an independent message back to the server node for each detected Wi-Fi SSID to avoid LoRa buffer overflow. The speed test initiation request tells the destination sensor node to activate the Wi-Fi bearer, connect to the specified SSID, and perform an iPerf speed test over the Wi-Fi data plane. The iPerf server internet protocol (IP) address is specified in the message. Any iPerf server may be used, including, but not limited to, a module on the controller program host, a border gateway, a network management system (NMS), an element management system (EMS), an embedded server, or a standalone server. A flag is set on the controller program to prevent reentrant execution of the same speed test target. Sensor nodes also send a single message to the server node containing the results upon speed test completion. The server node clears the reentrancy prevention flag upon receiving the speed test results.

FIG. 1 illustrates a block diagram of system for autonomous network surveying, according to an embodiment. Some embodiments provide an effective network quality measurement system.

The computer 100 comprises a processor 110 operatively coupled to a data storage device and memory. In some embodiments, the processor 110 controls the overall operation of the computer 100 by executing computer program instructions that define such operations. The computer program instructions may be stored in a data storage device 120, or another non-transitory computer-readable medium, and loaded into a memory 130 when execution of the computer program instructions is desired. Thus, the modules described for user interaction, inter-node communication, and other functions can be defined by the computer program instructions stored in the memory 130 and/or a data storage device 120 and controlled by the processor 110 executing the computer program instructions.

The computer 100 includes one or more network interfaces 140 for communicating with other devices via a network. The computer 100 may also include one or more input/output devices 150 that enable user interaction with the computer 100 (e.g., display, keyboard, touchpad, mouse, speakers, buttons, etc.).

The processor 110 can include, among others, special purpose processors with software instructions incorporated in the processor design and general-purpose processors with instructions in the storage device 120 or the memory 130, to control the processor 110, and might be the sole processor or one of multiple processors of the computer 100. The processor 110 may be a self-contained computing system, containing multiple cores or processors, a bus, memory controller, cache, etc. A multi-core processor may be a symmetric or asymmetric processor 110, the data storage device 120, and/or the memory 130 may include, be supplemented by, or incorporated in, one or more application-specific integrated circuits (ASICs) and/or one or more field-programmable gate arrays (FPGAs). It can be appreciated that the disclosure may operate on a computer 100 with one or more processors 110 or on a group or cluster of computers networked together to provide greater processing capability.

The data storage device 120 and the memory 130 may each comprise a tangible non-transitory computer-readable storage medium. By way of example, and not limitation, such non-transitory computer-readable storage medium can include random access memory (RAM), high-speed random access memory (DRAM), static random access memory (SRAM), double data rate synchronous dynamic random access memory (DDR RAM), read-only memory (ROM), erasable programmable read-only memory (EPROM), electrically erasable programmable read-only memory (EEPROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

The network/communication interface 140 enables the computer 100 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, and not limitation, such suitable communications standards, protocols, and technologies can include Ethernet, Wi-Fi (e.g., IEEE 802.11), Wi-MAX (e.g., IEEE 802.16), VLAN (e.g., IEEE 802.1Q), LPWAN (e.g., LoRa, Sigfox, NB-IoT), Bluetooth, near field communications ("NFC"), radiofrequency systems, infrared, GSM, EDGE, HS-DPA, CDMA, TDMA, quadband, VoIP, IMAP, POP, XMPP, SIMPLE, IMPS, SMS, or any other suitable communications protocols. By way of example, and not limitation, the network interface 140 enables the computer 100 to transfer data, synchronize information, update software, or any other suitable operation.

The input/output devices 150 may include peripherals, such as a printer, scanner, monitor, etc. The input/output devices 150 may also include parts of a computing device. In some embodiments, the computer 100 acts as a headless server computer without the input/output devices 150.

Any or all of the systems and apparatus discussed herein, including personal computers, tablet computers, hand-held devices, cellular telephones, servers, databases, cloud-computing environments, virtual computing environments, and components thereof, may be implemented using a computer such as the computer 100. An implementation of an actual computer or computer system may have other structures and may contain other components as well.

Figure 2:
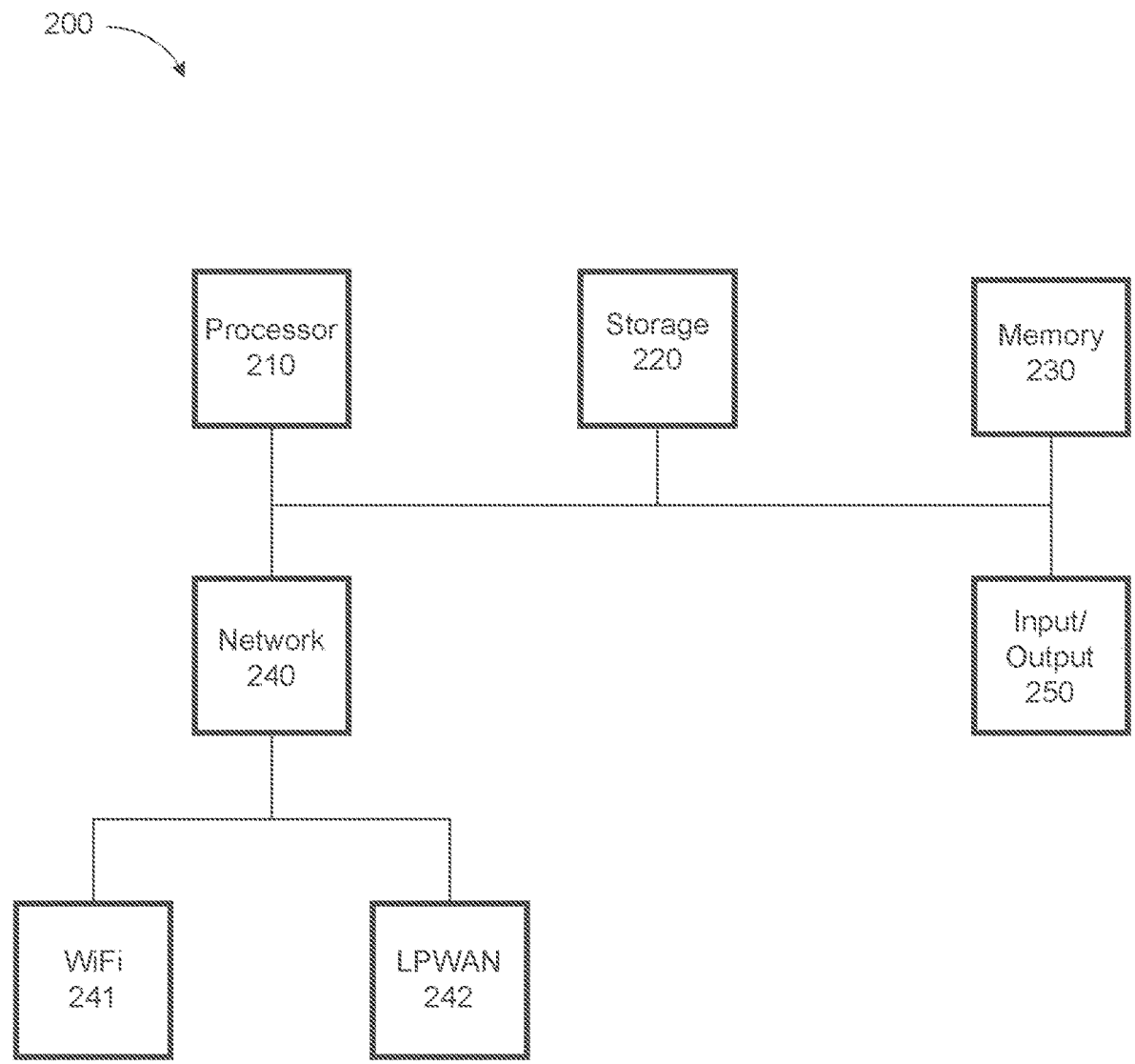
FIG. 2 illustrates a block diagram of a system for autonomous network surveying, according to an embodiment.

FIG. 2 illustrates a block diagram of a system for autonomous network surveying, according to an embodiment. Embodiments may provide a system separate from the network to be tested to avoid inaccurate test results.

A multi-bearer system on chip (SoC) microcontroller computer node 200 is an example of a computer used to implement the system. The processor 210 is used to implement a mesh network algorithm to support the backbone of the system. The memory 230 is used to implement edge cache to support disconnected operation of associated human interface devices (HIDs) to overcome backbone connectivity issues. The network/communication interface 240 contains multiple physical interfaces, the Wi-Fi interface 241, and the LPWAN interface 242. The Wi-Fi interface 241 is used to communicate between the node 200 and an off-the-shelf hand-held HID, or between the node 200 and a wireless access point. By way of example, and not limitation, such HID can include smartphones, tablets, laptops, etc. The LPWAN interface 242 is used to implement the backbone communication network of the inventive system.

Figure 3:
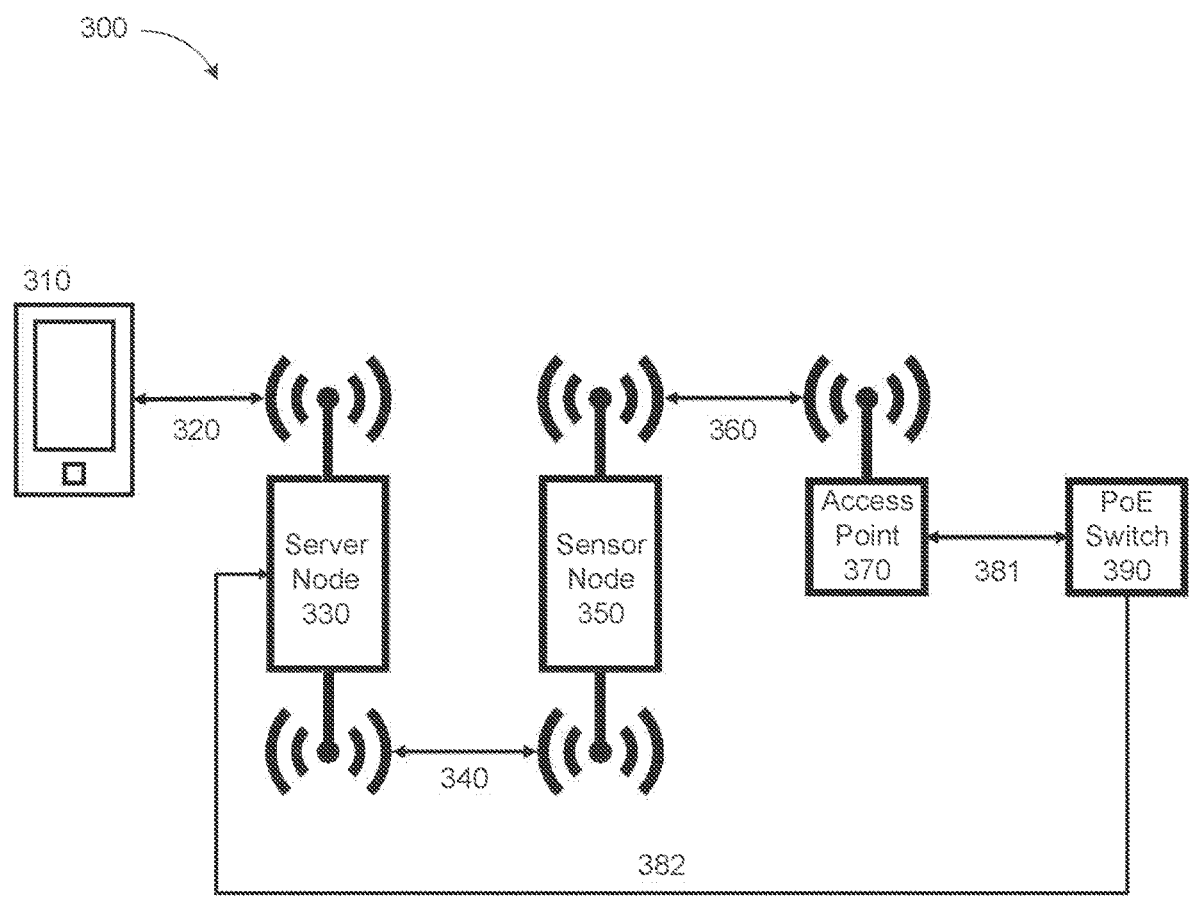
FIG. 3 illustrates a block diagram of a network, according to one embodiment.

FIG. 3 illustrates a block diagram of a network, according to one embodiment. Embodiments may provide a simple and effective testing structure.

The graphical user interface (GUI) may execute on a human interface device (HID) 310. By way of example, and not limitation, such HID 310 may include smartphones, tablets, laptops, etc. A person in a customer relations managerial position, including, but not limited to, network administrator, general manager, front desk manager, etc., can request an analysis of the property wireless Wi-Fi network. The manager may interact with the GUI on the HID 310 to start the process for the analysis. The HID 310 may use a Wi-Fi connection 320 to communicate with a multi-bearer system on chip (SoC) microcontroller computer node 330. A server node 330 is used to relay the requests the user desires for the system to perform and utilizes a LoRa connection 340 to communicate with a sensor node 350 and distribute commands across the sensor fleet of the system. The sensor node 350 is used to perform the tasks specified by the user on the GUI on the HID 310 and uses the Wi-Fi connection 360 to communicate with an access point 370 to perform Wi-Fi probes and Wi-Fi speed tests. The access point 370 may both continually broadcast beacon messages to enable the success of a probe and use an Ethernet connection 381 to communicate with a PoE switch 390, which may use the Ethernet connection 382 to communicate with the server node 330 to perform Wi-Fi speed tests.

Figure 4:
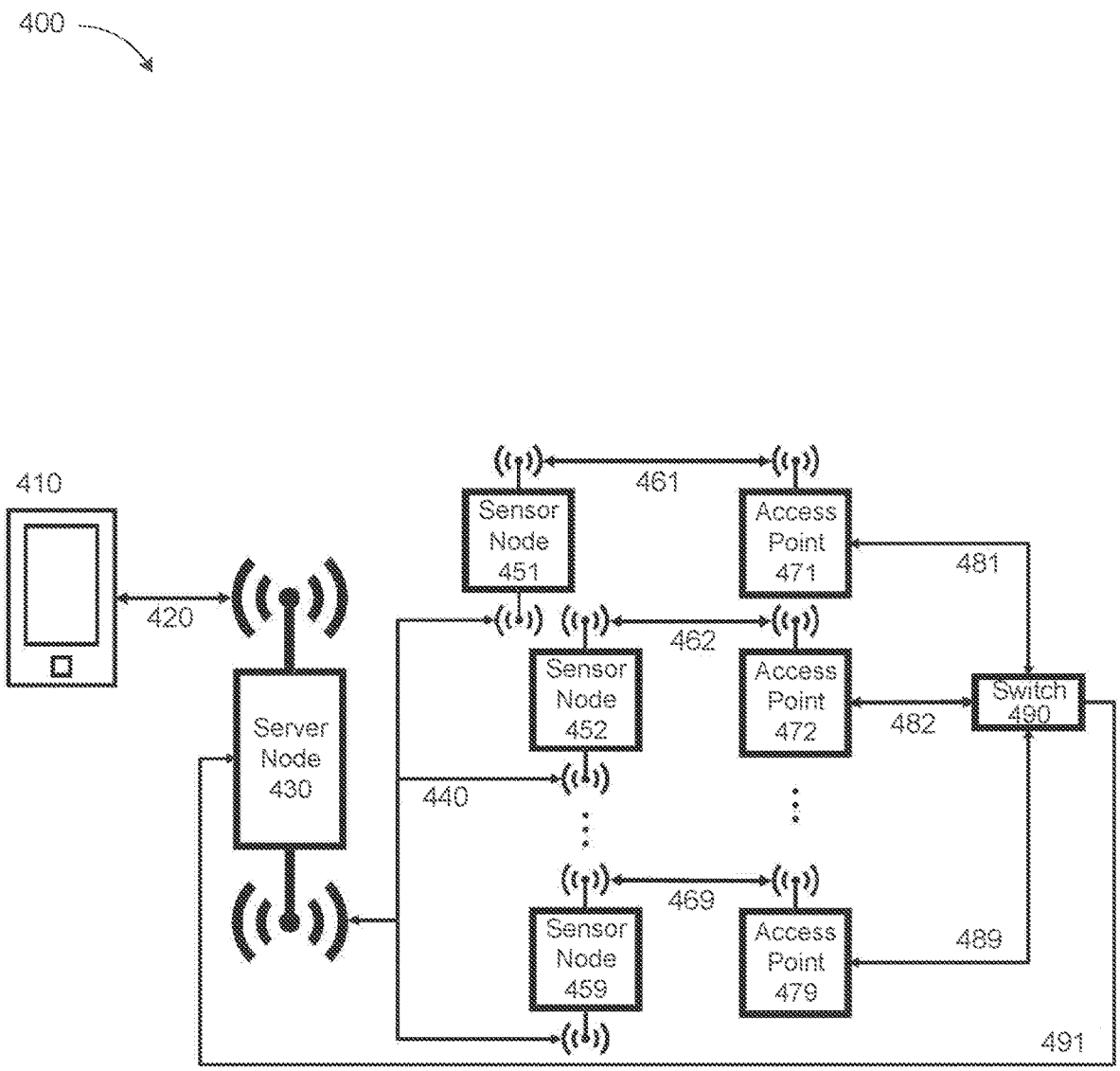
FIG. 4 illustrates an expanded block diagram of a network, according to one embodiment.

FIG. 4 illustrates an expanded block diagram of a network, according to one embodiment. Embodiments may allow for implementation of LoRa connection to service a sensor network.

The graphical user interface (GUI) may execute on a human interface device (HID) 410. By way of example, and not limitation, such HID can include smartphones, tablets, laptops, etc. The HID 410 uses a Wi-Fi connection 420 to communicate with a multi-bearer system on chip (SoC) microcontroller computer node 430. The server node 430 uses the LoRa connection 440 to communicate with sensor nodes 451, 452, 459, etc. The sensor nodes 451, 452, 459, etc. use the Wi-Fi connections 461, 462, 469, etc. to communicate with the access points 471, 472, 479, etc. to perform the Wi-Fi probes and the Wi-Fi speed tests. The access points 471, 472, 479, etc. use the Ethernet connections 481, 482, 483, etc. to communicate with the PoE switch 490, which uses the Ethernet connection 491 to communicate with the server node 430 to perform Wi-Fi speed tests.

Figure 5:
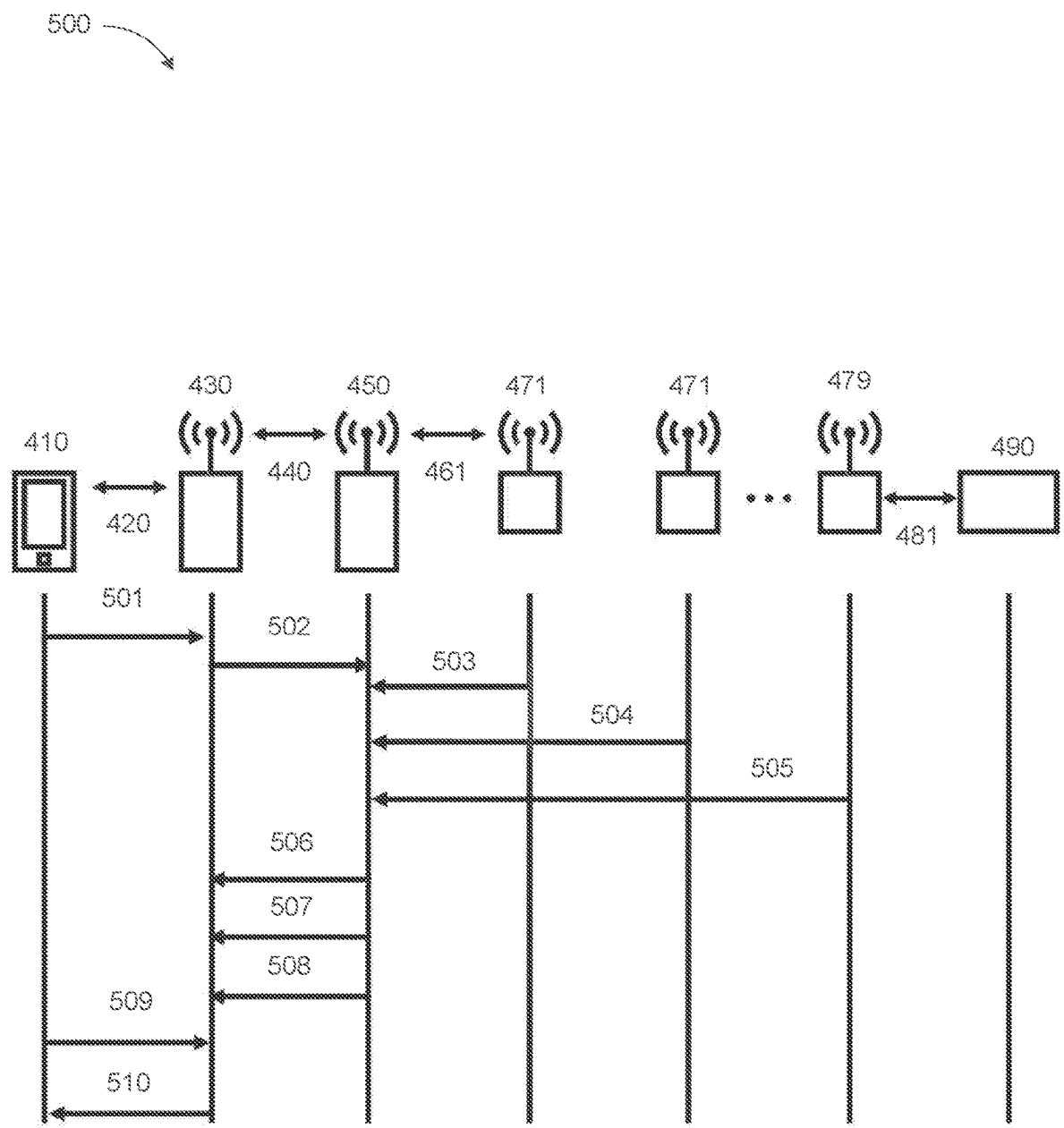
FIG. 5 illustrates a sequence diagram of a probe messaging sequence, according to one embodiment.

FIG. 5 illustrates a sequence diagram of a probe messaging sequence, according to one embodiment. Some embodiments provide resilient speed testing for wireless networks.

Some embodiments provide a probe messaging sequence between a smartphone 410, server node 430, sensor node 451, access points 461, 462, 469, etc., and PoE switch 490 for Wi-Fi probes. In some embodiments, the smartphone 410 sends an HTTP POST request in process 501 over a Wi-Fi connection 420 to a server node 430 to initiate a probe. The server node 430 broadcasts the message from the smartphone 410 across the network using the LPWAN connection 440 in process 502. The sensor node 450 receives the probe request and starts scanning for nearby Wi-Fi SSIDs. Beacon signals from one or more access points 461, 462, 469, etc. are received by the sensor node 450 in processes 503, 504, and 505. The sensor node 450 may send all of the Wi-Fi SSIDs that it detected one at a time back to the server node 430, represented by processes 506, 507, and 508. In some embodiments, the smartphone 410 sends an HTTP GET request to the server node 430 in process 509 over the Wi-Fi connection 420 to request the probe results. In some embodiments, the server node 430 returns the list of all detected Wi-Fi SSIDs to the smartphone 410 in process 510 over the Wi-Fi connection 420.

Figure 6:
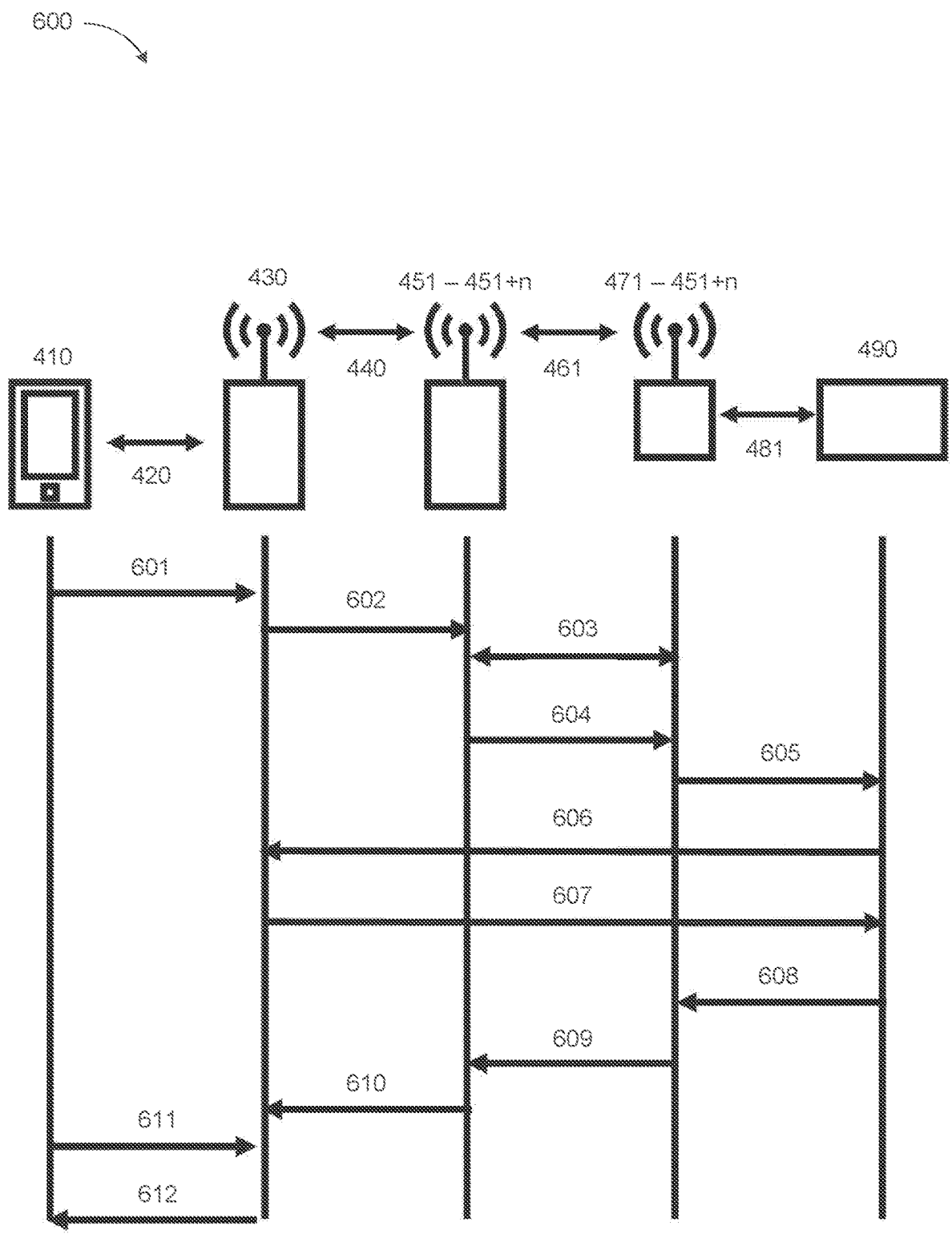
FIG. 6 illustrates a sequence diagram of a testing messaging sequence, according to one embodiment.

FIG. 6 illustrates a sequence diagram of a testing messaging sequence, according to one embodiment. Embodiments may provide a reliable system for verifying a state of a wireless network.

Some embodiments provide probe messaging sequence between a smartphone 410, server node 430, sensor node 451, one or more access points 461, 462, 469, etc., and a PoE switch 490 for Wi-Fi speed tests. In some embodiments, the smartphone 410 may send an HTTP POST request in process 601 over the Wi-Fi connection 420 to the server node 430 to initiate a speed test. The server node 430 may broadcast the message from the smartphone 410 across the network using the LPWAN connection 440 in process 602. In some embodiments, the sensor nodes 451, 452, 459, etc. receive the speed test request and connect to the user-specified Wi-Fi SSID at the nearest wireless access point associated with the requested SSID in process 603 over a Wi-Fi connection 460. This access point can be one or more of the access points 461, 462, 469, etc. The sensor nodes 451, 452, 459, etc. may send speed test packets to one or more of the access points 461, 462, 469, etc. in process 604.

In some embodiments, the access points 461, 462, 469, etc. forward the packets to the PoE switch 490 in process 605 via one or more of the Ethernet connections 481, 482, 489, etc. The PoE switch 490 may forward the speed test packets to the server node 430 in process 606. In some embodiments, the server node 430 sends the speed test results back to the PoE switch 490 in process 607. The PoE switch 490 may then forward the results from the sensor node 430 to the access points 461, 462, 469, etc. in process 608 via the Ethernet connections 481, 482, 489, etc. In some embodiments, the access points 461, 462, 469, etc. send the speed test results to the sensor nodes 451, 452, 459, etc. in process 609 over the Wi-Fi connection 460. The sensor nodes 451, 452, 459, etc. may send the speed test results to the server node 430 over the LPWAN connection 440 in process 610. In some embodiments, the smartphone 410 sends an HTTP GET request to the server node 430 in process 611 over the Wi-Fi connection 420 to request the speed test results. The server node 430 may return the speed test results to the smartphone 410 in process 612 over the Wi-Fi connection 420.

Figure 7:
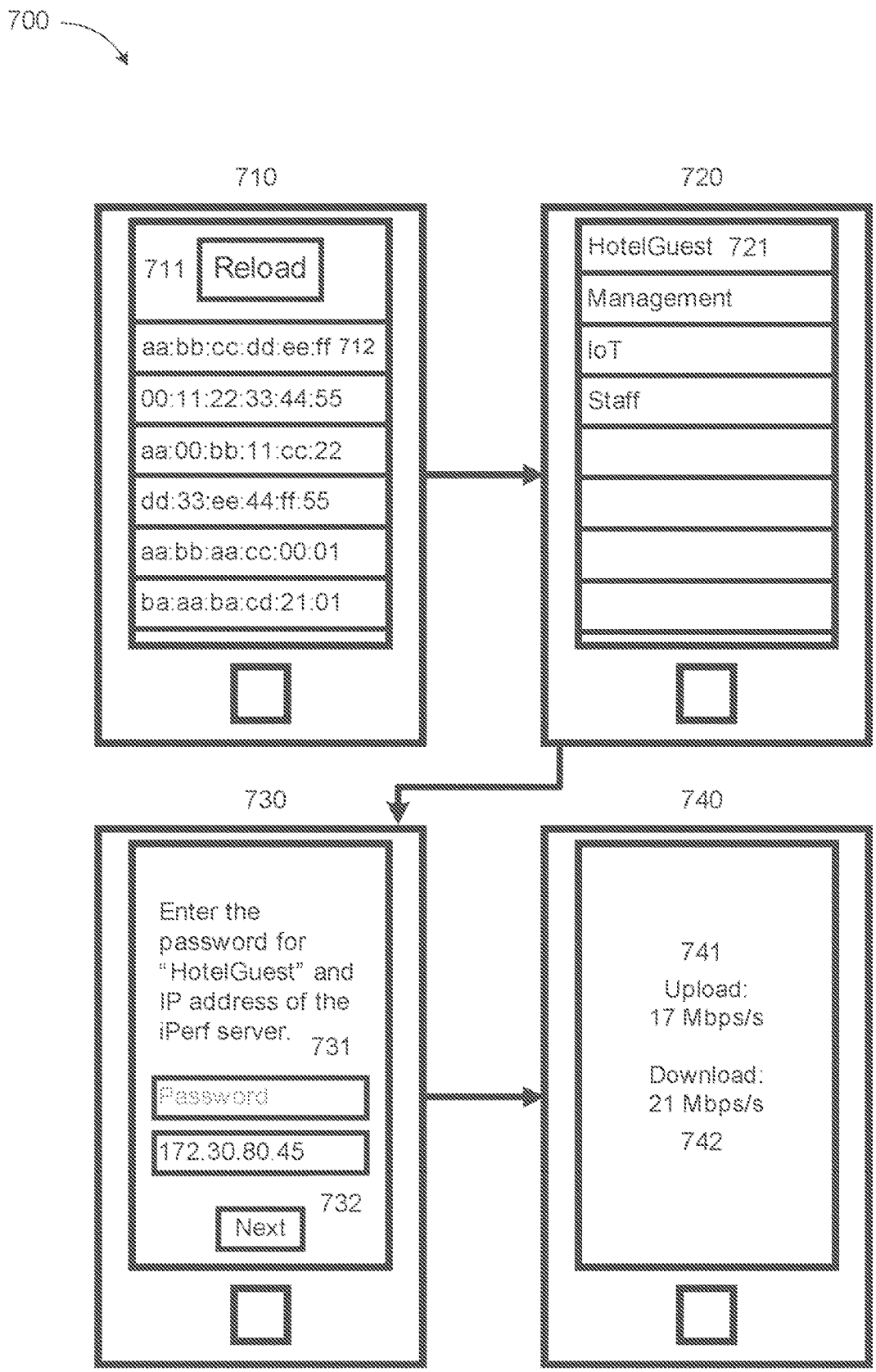
FIG. 7 illustrates a graphical user interface (GUI) series, according to one embodiment.

FIG. 7 illustrates a graphical user interface (GUI) series, according to one embodiment. Some embodiments may provide for an intuitive testing process executable from a mobile device or other human interface device (HID).

In some embodiments, the HID 710, 720, 730, 740 may include smartphones, tablets, laptops, etc. A GUI 700 may load a table and/or a reload button 711. In some embodiments, the table includes MAC addresses 712 that correspond to the MAC addresses of the sensor nodes deployed. In some embodiments, these are gathered from a probe that is performed when the sensor node table GUI 710 loads. The reload button 711 may perform another probe and reload the table with an updated list of MAC addresses.

In some embodiments, if one of the rows 712 is tapped in the table, the GUI may change to a Wi-Fi SSID selection table GUI 720. In the table, is the list of Wi-Fi SSIDs that the sensor node selected from sensor node table GUI 710 can detect. If one of the rows 721 is tapped in the table, the GUI then switches to input the GUI 730. In the GUI 730 there may be two text fields, a Wi-Fi SSID password text field 731 and a speed test server IP address text field 732. Once the proper information is filled out in the text fields, the user may tap the "Next" button to begin the speed test. The GUI then switches to a results-display GUI 740. The GUI initially displays text that states that the speed test is still running but may change once the speed test is completed and the results have been stored in the internal data store of the HID. The GUI 740 may then change to display the results of the speed test in two parts which may include the upload speed text box 741 and the download speed text box 742.

Figure 8:
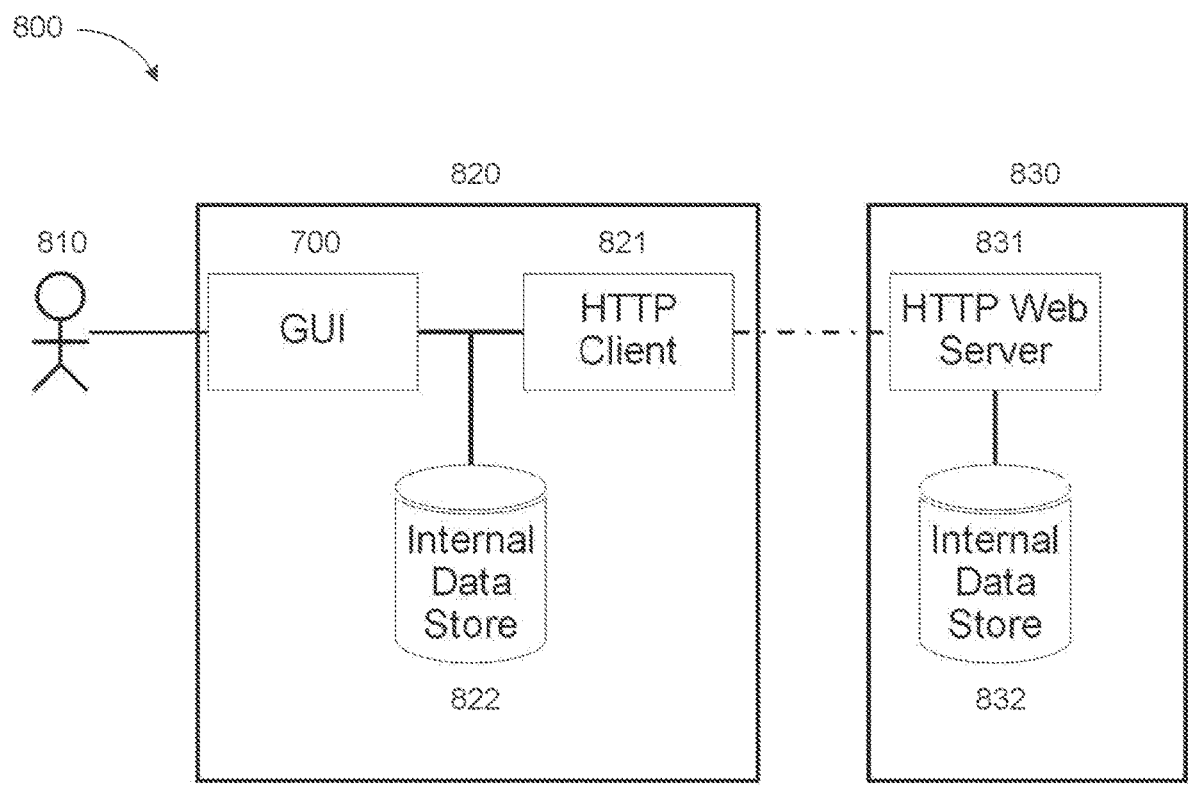
FIG. 8 illustrates a block diagram of a communication network, according to one embodiment.

FIG. 8 illustrates a block diagram of a communication network, according to one embodiment. Some embodiments may provide an intuitive application for interacting with a long-range bearer 800.

In some embodiments, the user 810 interacts with the GUI 700 on a device 820. The GUI 700 may be configured to instruct an HTTP client 821 within the device 820 to send the message that the user 810 wishes to send. The HTTP client 821 may communicate with the HTTP web server 831 over a wireless medium to send the requested message. The HTTP web server 831 may store the message sent by the HTTP client 821 in an internal data store 832.

In some embodiments, the GUI 700 can also instruct HTTP client 821 to gather newly received messages. The HTTP client 821 may communicate with the HTTP web server 831 to collect the list of messages. The HTTP web server 831 may retrieve the list from the internal data store 832 and reply to the HTTP client 821's request with the list. The HTTP client 821 may send the list to the GUI 700, which resolves the list with the list stored in the internal data store 822. The GUI 700 may then present the resolved list of messages to the user 810.

Figure 9:
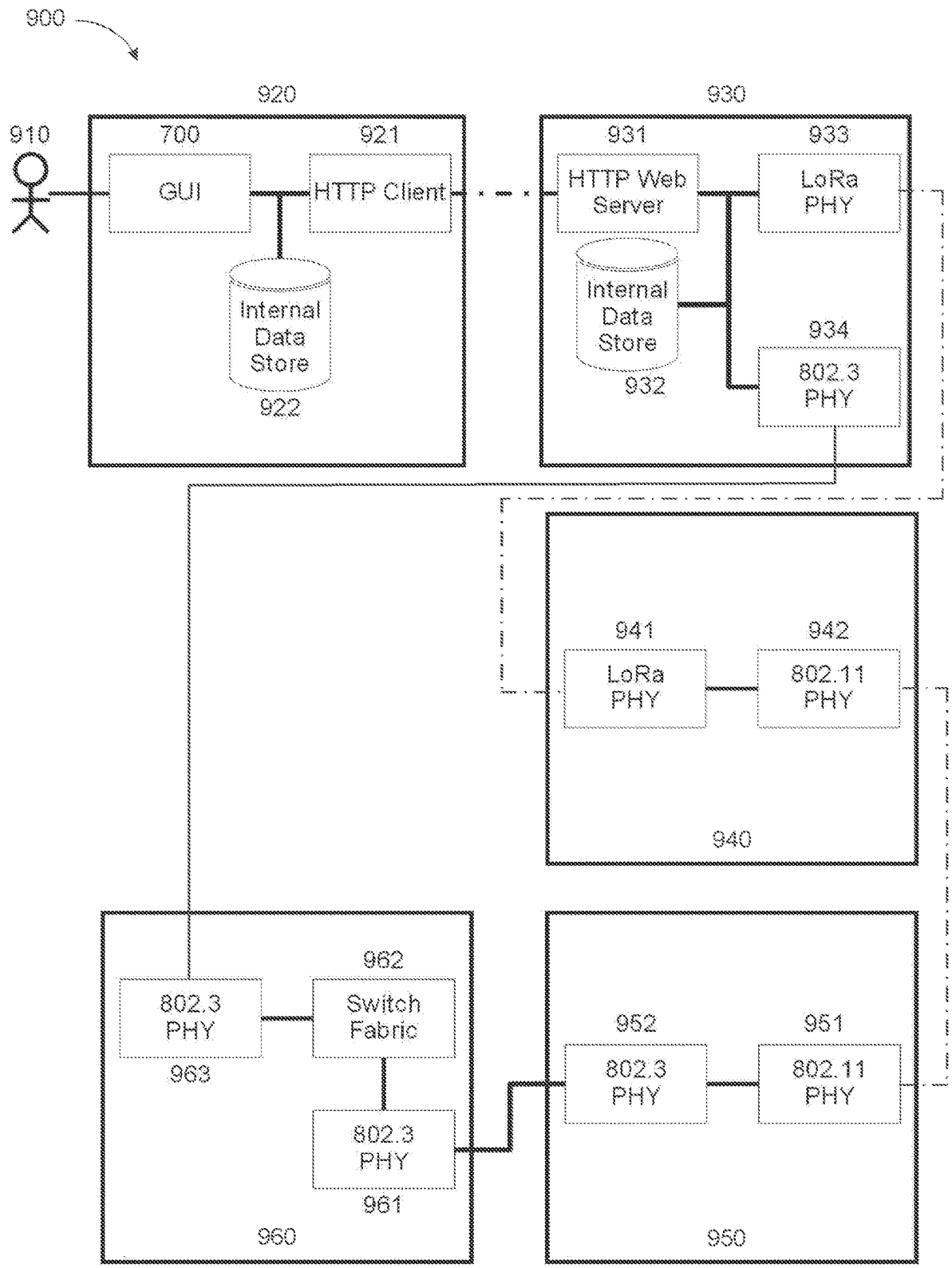
FIG. 9 illustrates a block diagram of an expanded communication network, according to one embodiment.

FIG. 9 illustrates a block diagram of an expanded communication network, according to one embodiment. Some embodiments provide an effective way of interacting with a network infrastructure 900.

In some embodiments, the user 910 interacts with the GUI 700 on the device 920. The GUI 700 on the device 920 may instruct the HTTP client 921 within the device 920 to send the message that the user 910 wishes to send. The HTTP client 921 on device 920 may communicate with the HTTP web server 931 on the device 930 over a wireless medium to send the requested message. In some embodiments, the HTTP web server 931 on the device 930 stores the message sent by the HTTP client 921 on the device 920 in the internal data store 932 on the device 930. The HTTP web server 931 on the device 930 may then instruct the LoRa PHY 933 on the device 930 to transmit the message that was stored in the internal data store 932 on the device 930. In some embodiments, the LoRa PHY 933 on the device 930 broadcasts the message, which is received by the LoRa PHY 941 on the device 940. The LoRa PHY 941 on device 940 may start a probe or speed test, depending on the command issued by the user 910 interacting with the GUI 700 on the device 920.

Figure 10:
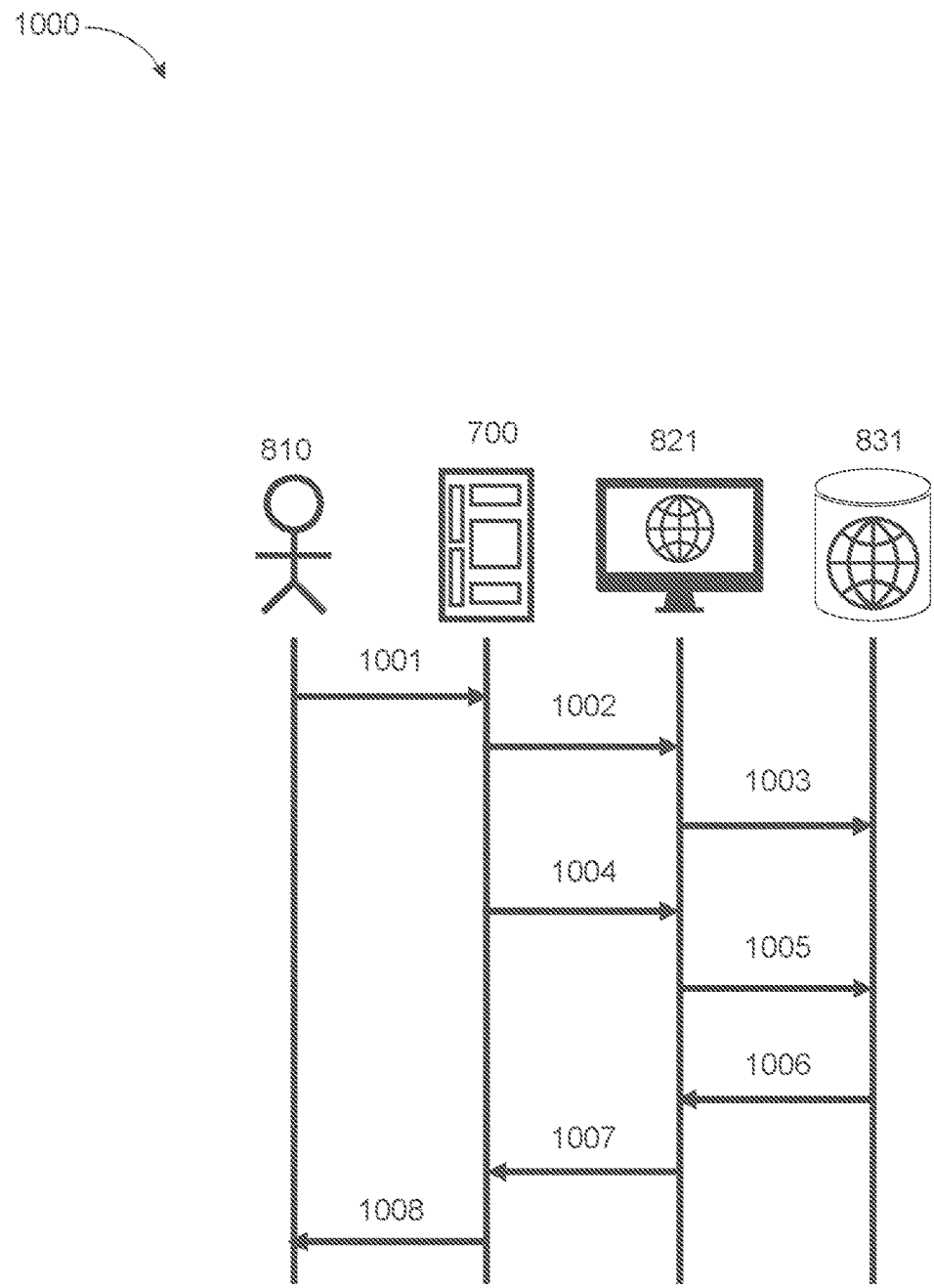
FIG. 10 illustrates a sequence diagram of phone interaction, according to one embodiment.

FIG. 10 illustrates a sequence diagram of phone interaction, according to one embodiment. Some embodiments provide a device application for interacting with a long-range bearer.

In some embodiments, the user 810 interacts with the GUI 700 to perform a request in process 1001. The GUI 700 may send the request from the user 810 to the HTTP client 821 in process 1002. In some embodiments, the GUI 700 instructs the HTTP client 821 to send the request from the user 810 to the HTTP web server 831 in process 1003. In some embodiments, after a user-determined amount of time has passed, the GUI 700 tells HTTP client 821 to pull the requested data from the HTTP web server 831 in process 1004. The HTTP client 821 may request the data from the HTTP web server 831 in process 1005. The HTTP web server 831 may send the data to the HTTP client 821 in process 1006. In some embodiments, the HTTP client 821 forwards the requested data to the GUI 700 in process 1007. The GUI 700 may present the requested data in an understandable format to the user 810 in process 1008.

Figure 11:
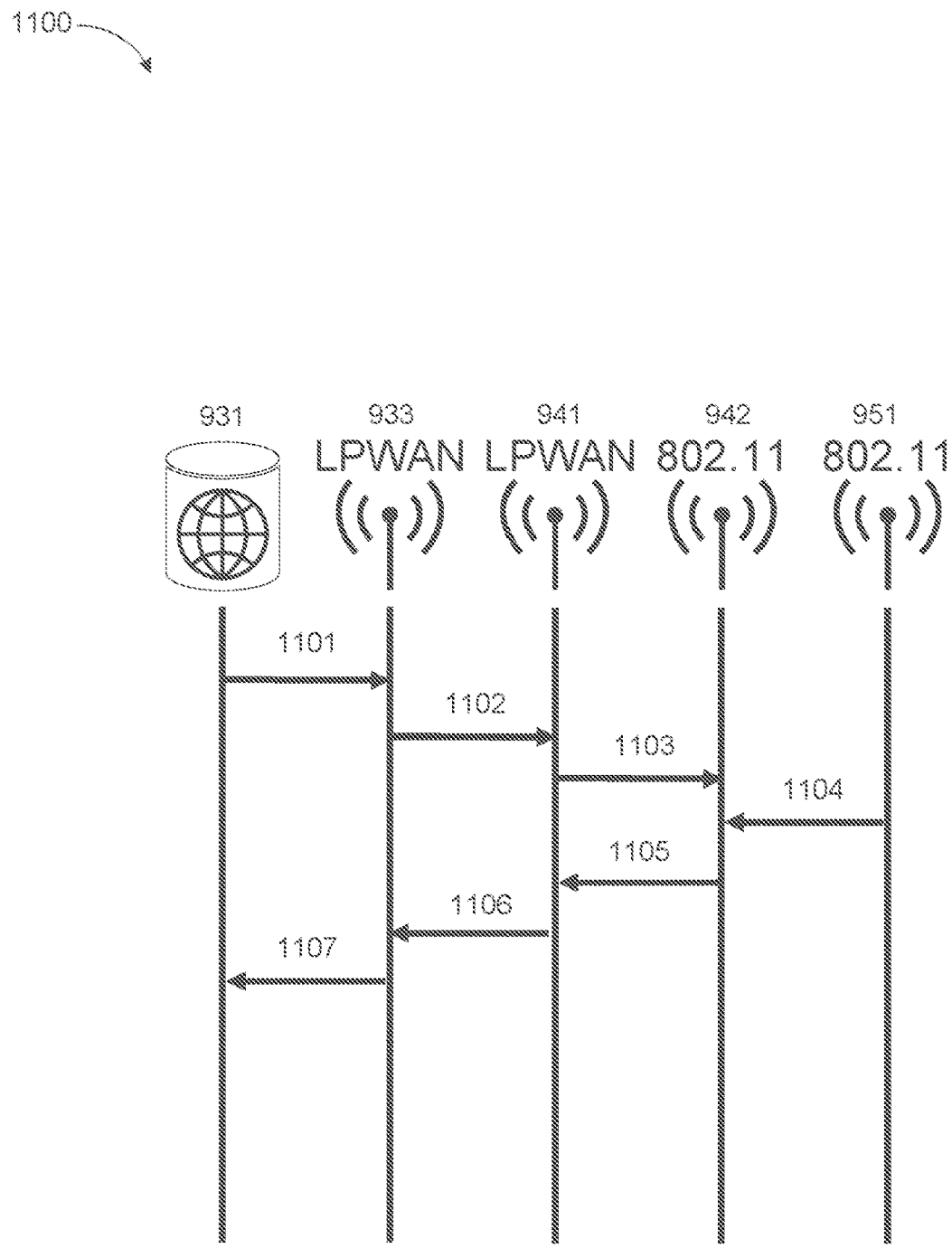
FIG. 11 illustrates a sequence diagram of a client to network interaction, according to one embodiment.

FIG. 11 illustrates a sequence diagram of a client to network interaction, according to one embodiment. Some embodiments provide a long-range bearer to perform a probe, interacting with a sensor node, an access point, and a networking switch between an HTTP web server 931, a LPWAN radio 933, a LPWAN radio 941, an 802.11 radio 942, and an 802.11 radio 951.

In some embodiments, the HTTP web server 931 sends a request, in process 1101, to the LPWAN radio 933. The LPWAN radio 933 may send one or more packets to the LPWAN radio 941 in process 1102. In some embodiments, the LPWAN radio 941 forwards the packets to the 802.11 radio 942 in process 1103. In some embodiments, the 802.11 radio 942 sends the packets to the 802.11 radio 951 in process 1104. The 802.11 radio 951 may forward the packets to the 802.3 transceiver 952, in process 1105. The 802.3 transceiver 952 may send the packets to the 802.3 transceiver 961 in process 1106.

The 802.3 transceiver 961 may then forward the packets to the switch fabric 962 in process 1107. The switch fabric 962 may redirect the packets to the 802.3 transceiver 963 in process 1108. In some embodiments, the 802.3 transceiver 963 sends the packets to the 802.3 transceiver 934 in process 1109. The 802.3 transceiver 934 may forward the packets back to the HTTP web server 931 in process 1110.

Figure 12:
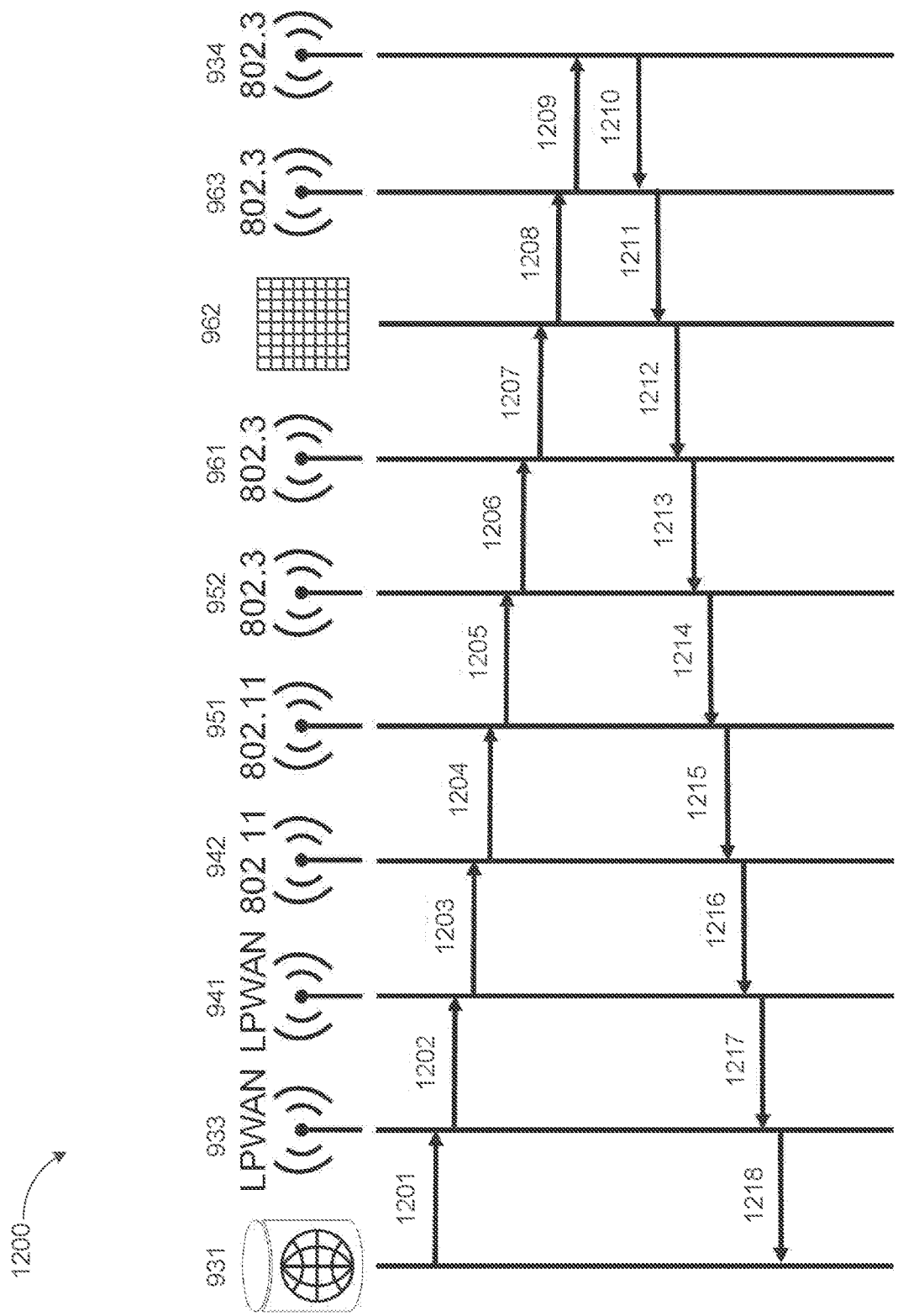
FIG. 12 illustrates a sequence diagram of an expanded client to network interaction, according to one embodiment.

FIG. 12 illustrates a sequence diagram of an expanded client to network interaction, according to one embodiment. Some embodiments provide a simple process for the long-range bearer to perform a speed test.

In some embodiments, the long-range bearer may interact with at least one of a sensor node, access point, and a networking switch between the HTTP web server 931, LPWAN radio 933, LPWAN radio 941, 802.11 radio 942, 802.11 radio 951, 802.3 transceiver 952, 802.3 transceiver 961, switch fabric 962, 802.3 transceiver 963, and 802.3 transceiver 934.

In some embodiments, the HTTP web server 931 may send a request, in process 1101, to the LPWAN radio 933. The LPWAN radio 933 may send packets to the LPWAN radio 941 in process 1102. The LPWAN radio 941 may then forward the packets to the 802.11 radio 942 in process 1103. In some embodiments, the 802.11 radio 942 sends the packets to the 802.11 radio 951 in process 1104. The 802.11 radio 951 may forward the packets to the 802.3 transceiver 952 in process 1105. The 802.3 transceiver 952 may send the packets to the 802.3 transceiver 961 in process 1106.

In some embodiments, the 802.3 transceiver 961 forwards the packets to the switch fabric 962 in process 1107. The switch fabric 962 may redirect the packets to the 802.3 transceiver 963 in process 1108. In some embodiments, the 802.3 transceiver 963 sends the packets to the 802.3 transceiver 934 in process 1109. In some embodiments, the 802.3 transceiver 934 forwards the packets back to the HTTP web server 931 in process 1110.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise.

Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. An example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A system comprising:
a graphical user interface on a user device, the graphical user interface configured to display a control to conduct a wireless network throughput test;
a wireless access network operating on a first communication band, wherein the first communication band is configured to provide access to a device connecting to the wireless access network, the wireless access network comprising:
an access point coupled to a central switch to provide a wireless communication signal for network access by devices in range of the access point;
a sensor node corresponding to the access point, wherein the sensor node is in communication with the access point of the wireless network over the first communication band; and
a server node in communication with the sensor node over a second communication band distinct from the first communication band and in communication with the central switch.

2. The system of claim 1, wherein the first communication band is a Wi-Fi radio band and the second communication band is a Long Range (LoRa) band.

3. The system of claim 1, wherein the second communication band forms a control plane for the sensor node to communicate with the server node.

4. The system of claim 1, wherein the server node is configured to communicate with a controller program to receive a request and relay the request to the sensor node and comprises:
a hypertext transfer protocol web server that responds to requests and initiates a test of the wireless access network.

5. The system of claim 1, wherein the server node is configured to measure network throughput of the wireless access network through communication with the sensor node.

6. The system of claim 1, wherein the sensor node is configured to send a list of detected nearby service set identifiers (SSIDs) to the server node.

7. The system of claim 1, wherein the server node is configured to distribute a test request to the sensor node through sequence number controlled flooding.

8. The system of claim 1, the sensor node is configured to execute a network throughput test on one or more corresponding access points and report a result to the server node.

9. A system comprising:
a wireless network comprising:
a central network switch; and
an access point coupled to the central network switch to provide network access to a device in communication with a first communication band;
a network test structure comprising:
a server node in communication with the central network switch; and
a sensor node in communication with the server node via a second communication band and the access point via the first communication band.

10. The system of claim 9, wherein the server node is in communication with the central switch via an Ethernet connection.

11. The system of claim 9, wherein at least one of the access point, the server node, or the sensor node receives power via a Power over Ethernet connection.

12. The system of claim 9, wherein the sensor node is configured to execute a throughput test on the access point via the first communication band.

13. The system of claim 12, wherein the sensor node is configured to detect at least one of a total time or payload size of the throughput test.

14. The system of claim 12, wherein the server node is configured to transmit the results of the throughput test to a user via the central network switch.

15. A method comprising:
sending a request from a web server to a server node via a switch fabric in response to request to execute a throughput test;
sending a packet corresponding to the throughput test from the server node to a sensor node over a low-power data plane;
receiving the packet at the sensor node and forwarding the packet to an access point over a Wi-Fi data plane; and
forwarding the packet from the access point to the switch fabric over the Wi-Fi data plane; and
forwarding the packet from the switch fabric to the web server.

16. The method of claim 15, wherein the access point is designated by the request sent from the web server.

17. The method of claim 15, wherein the throughput test is an iPerf test executed by the sensor node over the Wi-Fi data plane.

18. The method of claim 15, wherein the sensor node is designated by a media access control address.

19. The method of claim 15, further comprising scanning, by the sensor node, for all surrounding access points and transmitting a list of the surrounding access points to the server node.

20. The method of claim 15, further comprising generating a request at a client running on a user device not coupled directly to the low-power data plane.

* * * * *